Aug. 20, 1957     A. G. CLUNE     2,803,421
LIGHT REFLECTOR SIGNAL DEVICE
Filed Sept. 13, 1954
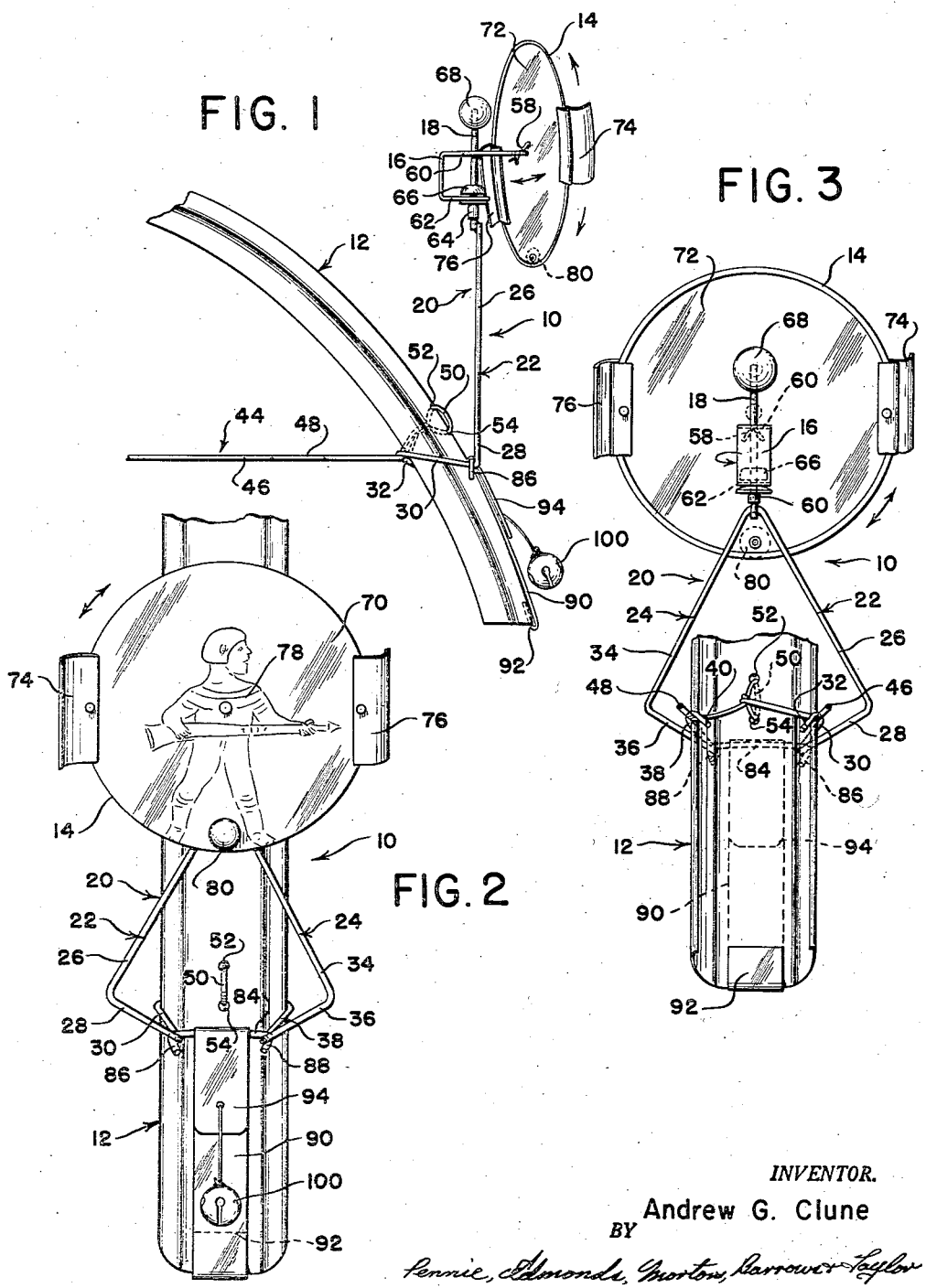
INVENTOR.
Andrew G. Clune
BY
ATTORNEYS United States Patent Office 2,803,421
Patented Aug. 20, 1957

2,803,421

LIGHT REFLECTOR SIGNAL DEVICE

Andrew G. Clune, New York, N. Y.

Application September 13, 1954, Serial No. 455,560

1 Claim. (Cl. 248—226)

This invention relates to light reflector signal devices and has for its object improvements in such devices particularly useful for bicycles.

Accidents to bicycle riders, serious and fatal, particularly to children, when struck by an automobile are increasing in number from year to year. This trend is of grave concern to parents and others concerned with highway accidents. A particularly dangerous time for children bicycle riders is at dusk, or early in the evening, just before they return, or while they are returning, home. The children tend to be tired, hurried and careless. In addition an operator of an automobile at that time of day is beset especially with difficulties. On first turning on his headlights, it is not easy for him promptly to focus his eyes sharply on hazards on or to the side of the road. Bicycles are for the most part unlighted; they frequently have no signal light reflectors; or at best they have inadequate reflectors. Such conditions are conducive to accidents which happen only too often to the sorrow of all concerned.

Although numerous attempts have been made to provide simple light reflectors for bicycles, those currently in use for the most part are woefully inadequate. They usually consist of small stationary or fixed reflectors secured to the rear mudguard of the bicycle. In a short time the reflectors are covered with dirt, so that their original insufficient light reflecting efficiency is soon reduced or lost.

My investigations have led to the discovery of improvements in light reflector signals that are simple devices and highly effective, that are attractive, child-appealing and that will function so efficiently as to attract quickly the attention of the operator of an oncoming automobile.

These and other features of the invention will better be understood by referring to the accompanying drawing, taken in conjunction with the following description, in which:

Fig. 1 is a side elevation of a light reflector signal device, shown mounted on the rear mudguard of a bicycle, illustrative of a practice of the invention;

Fig. 2 is a rear end elevation of the same with the main light reflector surface facing the viewer; and Fig. 3 is a front end elevation of the same with the rear of the main light reflector surface facing the viewer.

Referring first to Fig. 1, a light reflector signal device 10 is shown mounted on the rear mudguard 12 of a bicycle. The signal device includes a movable base plate 14 mounted on a U-shaped swivel bracket 16, pivotally mounted on an upright rod 18, the lower portion of which is secured to a holder 20 in the form of an inverted V-shaped clamp secured to the mudguard.

The clamp includes a pair of elongated wire members 22 and 24 (Figs. 2 and 3) in zig-zag relationship to each other, advantageously formed from a single piece of wire bent into the shape shown. The zig-zag relationship results in each of the wire members being divided into four pairs of complementary arms. Thus, member 22 is divided into angular sections: upper arm 26, intermediate arm 28, guard arm 30 and hook flange 32. Member 24 is divided into upper arm 34, intermediate arm 36, guard arm 38 and hook flange 40. This angularity tends to strengthen the arms, and hence adds to the over-all strength of the clamp.

Mudguard 12 is held in position over the rear wheel of the bicycle by a wire rod support 44 in the form of a pair of horizontally spaced arms 46 and 48 secured to the bicycle. The horizontal arms terminate in a twisted end portion 50 extending through a pair of spaced holes 52 and 54 in the center portion of the mudguard.

Base plate 14 is connected to and supported by swivel bracket 16 by means of a loosely fitting lateral pin 58, somewhat in the nature of a cotter pin. The head end of the pin extends through a hole in the center portion of the base plate and the other end of the pin extends through a hole in the end of the upper arm 60 of the swivel bracket. The lower arm 62 of the bracket rests on a turntable 64 mounted on the lower portion of upright rod 18. A removable stop 66 is also mounted on the upright rod, immediately above the turntable but between the two arms of the swivel bracket. This holds the bracket loosely in position and prevents it from jumping off the upright rod. Another removable stop 68, one preferably mounded for the sake of safety, is mounted on the top or free end of the upright rod. The rear surface 70, and even the back surface 72, of base plate 14 advantageously is formed in whole or in part of an efficient light reflecting surface. In the construction shown the base plate is provided with side flaps 74 and 76 which are intended to operate as wind vanes. As the bicycle is propelled, air strikes the vanes and causes the base plate to oscillate back and forth, thus helping to animate the signal device.

Since the device is intended primarily for the benefit of children, to stimulate their interest in its use, it is advantageous to provide an attractive child-appealing light-reflective design 78, particularly on the outer face 70 of the base plate. Among such designs may be configurations of cow-boys, Indians, moving picture-radio-television-circus personalities, cartoons, bandits, pirates, animals, toys, etc. In such case it is desirable to suspend or counterweight the base plate so that the design normally is in an upright position. This may be accomplished by attaching a weight 80 to the outer portion of the base plate and at the bottom of the design. While the base plate may swing to and fro, gravity will tend always to bring the weight and hence the base plate back to an upright position for the design. The base plate itself preferably is circular so as not to expose corners which could be injurious to a child.

Base plate 14 and swivel bracket 16 are so joined to lateral pin 58 as to provide what essentially is a universal joint. As will be clear from the three figures of the drawing, the base plate is free to swing and rotate in an almost endless number of planes. A variety of possible planes is assured by the pin, which is free to oscillate back and forth and to tilt somewhat in the hole in the base plate as well as in the upper arm of the swivel bracket, and by the bracket itself which is free to swivel on turntable 64. The bracket is free, of course, also to rise and fall on upright rod 18.

It will be clear, therefore, that as a child rides his bicycle over an uneven road surface, swaying as he necessarily must, the base plate is jerked, jolted, jounced and swayed in a great multitude of planes, each one of which exerts its own light-reflective characteristic. To an observer, such as an approaching motorist, there is presented, consequently, a continuously changing animated variety of reflected light, thus calling his attention to possible danger ahead and the necessity of proceeding with extra caution. In case the base plate is provided with a light-reflective configuration, as suggested, weight 80 by gravity causes it to assume and maintain a generally upright position—to the delight particularly of children.

One of the difficulties met in the art is that of attaching extra signal devices suitably to conventional bicycles. As noted, rear mudguard 12 is supported by a wire rod support 44 having a pair of horizontally spaced arms 46 and 48. Hook flanges 32 and 40 of the signal device are locked around arms 46 and 48 at the mudguard, the free ends of the flanges extending under the guard. A cross lock rod 84, with end hook flanges 86 and 88, is employed (Fig. 2) to lock intermediate arm 28 and guard arm 30 to intermediate arm 36 and guard arm 38 at their crooks. This is normally not sufficient to hold the signal device rigidly in general position. In addition a metal lock band or rod 90, with a bottom hook arm 92 and a top hook arm 94, is used. The metal band is made of fairly soft metal so that it may be bent by hand. First, bottom hook arm 92 is formed and hooked around the bottom of the mudguard. The upper end of the band is then passed under and tightly around cross rod 84, so that the signal device as a whole is pulled tightly against the mudguard. This latter bending of the metal band results in top hook arm 94. The length of the latter may vary from bicycle to bicycle. An important advantage of the metal band is that its upper bend line may be placed wherever it should be to do its job most efficiently. The signal device is thus rigidly secured to the mudguard at at least three triangular points, not to mention the friction of the parts in engagement with the mudguard.

The metal band preferably is light reflective, further to add to the over-all signaling effectiveness of the device. To the latter end a bell 100, or other noise-making device, or light reflector, may be suspended from top hook arm 94 or from the main body portion of band 90.

It will be clear to those skilled in this art that the specific device described in detail is by way of illustration only and that the practice of the invention lends itself readily to useful modifications.

I claim:

In a light reflector signal device for a bicycle, the improvement comprising a pair of zig-zag members juxtaposed to and spaced from each other, each member including in connected series an end arm to support a light reflector, an intermediate arm, a mudguard arm to fit over a limited portion only of the mudguard of the bicycle, a crook being formed between the intermediate arm and the mudguard arm where they join each other, hook flanges to fit under and around a beaded edge of the mudguard, an adjustable cross-lock rod securable at its ends to the crooks to bridge the gap between the guard arms and adapted to be moved to draw the guard arms and the hook flanges toward each other when the device is attached to the mudguard, and a metal lock band with a bottom hook arm for fitting around the bottom portion of the mudguard and a top hook arm for fitting around the adjustable cross-lock rod and drawing the signal device securely to the mudguard.

References Cited in the file of this patent

UNITED STATES PATENTS

| 300,427 | Zanger | June 17, 1884 |
| 354,261 | Smith | Dec. 14, 1886 |
| 1,555,659 | Gough | Sept. 29, 1925 |

FOREIGN PATENTS

| 3,196 | Great Britain | of 1889 |